United States Patent
Ritz et al.

(10) Patent No.: US 7,521,871 B2
(45) Date of Patent: Apr. 21, 2009

(54) TRANSPARENT ZIRCONIUM OXIDE-TANTALUM AND/OR TANTALUM OXIDE COATING

(75) Inventors: Arnd Ritz, Heinsberg (DE); Michael Vergöhl, Cremling-Destedt (DE); Berno Hunsche, Braunschweig (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 243 days.

(21) Appl. No.: 10/543,286

(22) PCT Filed: Jan. 21, 2004

(86) PCT No.: PCT/IB2004/000132

§ 371 (c)(1),
(2), (4) Date: Jul. 3, 2006

(87) PCT Pub. No.: WO2004/000132

PCT Pub. Date: Aug. 12, 2004

(65) Prior Publication Data

US 2006/0280950 A1   Dec. 14, 2006

(30) Foreign Application Priority Data

Jan. 28, 2003   (EP) .................................. 03100167

(51) Int. Cl.
*H01J 17/16*   (2006.01)

(52) U.S. Cl. ..................................................... 313/635
(58) Field of Classification Search ................. 313/493, 313/634, 635
See application file for complete search history.

(56) References Cited

U.S. PATENT DOCUMENTS

| 3,783,010 | A | 1/1974 | Wille |
| 4,260,222 | A | 4/1981 | Kozawa |
| 4,707,820 | A | 11/1987 | Sawamura |
| 5,181,141 | A | 1/1993 | Sato et al. |
| 6,229,211 | B1 * | 5/2001 | Kawanoue et al. .......... 257/751 |
| 6,356,020 | B1 | 3/2002 | Cottaar |

FOREIGN PATENT DOCUMENTS

| DE | 3026703 | 1/1982 |
| DE | 3537922 A1 | 2/1993 |
| DE | 3537922 C2 | 2/1993 |
| JP | 04204902 A | 7/1992 |

\* cited by examiner

*Primary Examiner*—Vip Patel

(57) ABSTRACT

High temperature-resistant transparent coatings based on zirconium oxide, which have improved dispersion properties and a high refractive index, comprise zirconium oxide with at least one additive from the group consisting of tantalum and/or tantalum oxide, whereby the proportion of Ta atoms, in relation to the total number of metal atoms in the coating is in the range of 5 to 30%.

21 Claims, 1 Drawing Sheet

TRANSPARENT ZIRCONIUM OXIDE-TANTALUM AND/OR TANTALUM OXIDE COATING

Figure 1:
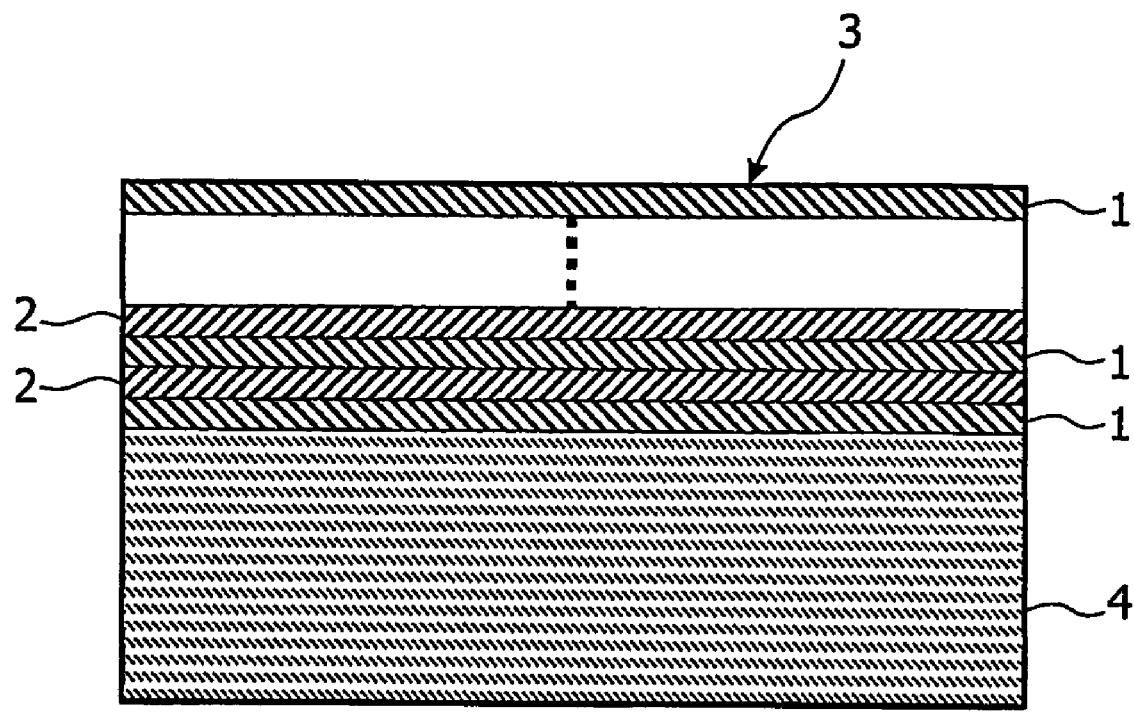

The invention relates in general to a transparent zirconium oxide coating or coatings with at least one additive from the group comprising tantalum and/or tantalum oxide, whereby the coating has an improved high-temperature stability.

The invention relates in particular to transparent coatings in the form of thin coatings or films based on the transparent zirconium oxide coating(s), whereby the zirconium oxide coating(s) contains or contain an additive from the group comprising tantalum and/or tantalum oxide.

It is known to apply coatings to the external or internal surface of lamps, such as projector lamps, in order to selectively reflect chosen light components over a specified wavelength range from the transparent spectrum. In doing so, depending on the active principle of the coating and the geometry of the lamp bulb, the entire lamp bulb can be covered. This is, for example, the case with commercially available halogen lamps. In a halogen lamp of this kind, a filament or a wire is arranged in the centre of a glass bulb and an optical interference film or a transparent interference coating system is applied to the external surface of the bulb. The transparent interference coating system is permeable to rays in the visible range, while infrared rays are reflected. Infrared rays contained in the light emitted from the filament are reflected by the transparent interference coating system back to the filament causing the filament to heat up. This leads to a decrease in the proportion of infrared rays in the emitted light and to an increase in the luminous efficiency.

As an alternative to the complete coating of the light bulb it is also possible for only a certain proportion of the lamp surface to be coated. This is, for example, the case with bowl reflector lamps and is in particular used in high performance lamps. High intensity discharge (HID) and in particular ultra-high performance (UHP) lamps are preferred for projection purposes, inter alia, because of their transparent properties. For these applications the most concentrated possible light source is required, so that the arc that forms between the electrode tips does not exceed a length of approximately 0.5-2.5 mm. Furthermore, the highest possible light intensity is desired. These properties can best be achieved with UHP lamps. These lamps comprise the mercury burner in a thick-walled quartz glass bulb, which in turn is cemented into an ellipsoid-shaped glass body so that the plasma mid-point of the mercury burner is positioned congruently with a focal point of the ellipsoid. The internal surface of the ellipsoid has a selective dielectric thin mirror-coating. The light radiated by the arc is emitted via the interference mirror-coating preferably in a hemisphere of the light bulb. The result is therefore that the light from the light bulb can be used more efficiently for the projection system, thereby at the same time opening up the possibility of further miniaturization.

Because of the great flexibility in the spectral effect, multi-layer interference filters are frequently used for transparent coatings. Multi-layer interference filters of this kind frequently comprise stacks of at least two different dielectric materials with differing refractive indexes. The transmission and reflection areas of these filters are determined by the coating thicknesses of the individual coatings of high refractive index and low refractive index materials applied. Filters of this kind may comprise an individual coating, as in a very simple mirror-coating, or several hundred coatings, as in a multiplexer in transparent communications.

In the design of such filter stacks, the difference in refractive index of the materials used is of particular importance. In general, the greater this difference in refractive index is, the easier it is to achieve a specified spectral target function. For example, where the difference in refractive index is high the number of coatings in the design and the total thickness are lower which has a positive effect on production costs.

For transparent coatings on lamps, in particular for lamps with quartz bulbs, because of the almost perfect matching of the thermal coefficients of expansion to the wall material of the lamp, and because of the low refractive index for the low refractive index coatings, $SiO_2$ is usually used. For high refractive index coatings various materials can be used, for example $TiO_2$, $Ta_2O_5$ and $Nb_2O_5$. For high-performance lamp applications, such as UHP lamps, which operate at temperatures of 1,000° C., these standard materials with high refractive index cannot be used, however, since they do not have sufficient stability.

Apart from the transparent aspects, mechanical aspects must also be taken into account: for example, properties such as phase transformations in the application temperature range and recrystallization behavior at high temperatures. A phase transformation or change in the phase transition can lead to a failure of the respective component, for example through a change in the refractive index and/or the coating thickness.

For this reason, when used on high-performance lamps, a compromise must be reached between the transparent properties and the material stability. An example of a material that is stable at high temperature, and which is suitable for transparent coatings, is zirconium oxide, or $ZrO_2$. This material has a relatively low refractive index, however, of $n \approx 2.2$ at $\lambda = 550$ nm and during tempering at above 800° C. shows signs of coating dispersion.

When used in a projection system which makes high demands on the geometric quality of the light emitted, this dispersion leads to losses in system efficiency, since light, which is deflected from its specified direction by dispersion, can no longer be focused on the main reflector of the lamp system in the entry aperture of the projection system, i.e. the filter spectrum deteriorates.

From U.S. Pat. No. 6,356,020 a special coating system is known, the first coating of which is a low refractive index coating on a substrate. At least one of the high refractive index coatings is in turn composed of 3 high refractive index individual coatings, the middle one of which can comprise $Ta_2O_5ZrO_2$. In U.S. Pat. No. 6,356,020, however, neither a specified crystal structure nor a specified march of temperature is disclosed for the production of the coating system.

It is an object of the present invention to improve the transparent properties of high temperature-resistant zirconium oxide coatings. In doing so, in particular, the dispersion characteristics and the refractive index of $ZrO_2$ coatings should be improved without this harming the thermal stability.

It has now been found that high refractive index zirconium oxide coatings with low dispersion properties are obtained if a small quantity of tantalum or tantalum oxide is incorporated in the coatings.

The object of the present invention is in a first embodiment a transparent, temperature-stable coating, containing zirconium oxide with at least one additive from the group comprising tantalum and/or tantalum oxide, wherein the proportion of Ta atoms in the coating, in relation to the total metal atoms in the coating (1), is in the range of 5 to 30%.

The coating according to the invention is preferably amorphous.

Coating(s) of this kind according to the invention can be used for coating lighting media, such as lamps, that are suitable for lighting purposes, in particular in motor vehicles.

The transparent coating according to the invention includes zirconium oxide, which contains a tantalum and/or tantalum oxide additive. This Ta additive is used in specific quantities, in relation to the total number of metal atoms in the transparent coating, with the following atomic ratio applying:

$$0.05 \leq Ta/Me \leq 0.30$$

where Me denotes the total number of metal atoms in the transparent coating. Preferred transparent coatings according to the invention have no metal atoms other than Zr and Ta, so that the following atomic relation applies:

$$0.05 \leq Ta/(Zr+Ta) \leq 0.30$$

where the element symbols denote the number of the respective metal atoms.

Further preferred transparent coatings according to the invention contain zirconium and tantalum in oxidic form only, preferably as $ZrO_2$ or $Ta_2O_5$. Accordingly, so are transparent coatings, which comprise zirconium oxide and tantalum oxide, with a proportion of Ta atoms, in relation to the total number of metal atoms in the coatings, that is in the range of 5 to 30%, preferably 10 to 25%, and more preferably 15 to 20%.

The proportion of zirconium atoms in the coating, in relation to the total proportion of metal atoms in the coating, is 70 to 95%, preferably 75 to 90%, and more preferably 80 to 85%.

The zirconium proportion and the tantalum proportion of the coating according to the invention are selected so that the respective proportions make up a maximum of 100% by weight, in relation to the total weight of this coating.

Zirconium oxide, also referred to as $ZrO_2$ in the description, can within the context of this invention also denote $ZrO_x$, in which x=1.9 to 2.1.

Tantalum oxide, also referred to as $Ta_2O_5$ in the description, can within the context of this invention also denote $Ta_2O_x$, in which x=4.9 to 5.1.

The temperature-stable, transparent coating, containing zirconium oxide with at least one additive from the group comprising tantalum and/or tantalum oxide, can be deposited by chemical vapor deposition, in particular sputtering, at a deposition temperature of between 20 and 300° C. from at least one titanium target, comprising zirconium oxide and tantalum and/or tantalum oxide, on the substrate surface to be coated at a definable oxygen partial pressure p.

This also has the advantage that substrates which should not be heated to above 150° C. can now also be coated.

The placing or the application of the coatings according to the invention on or in bodies such as lamps, glass, in particular heat protection glass, plastics, gas sensors, transparent interference filters, transparent filter systems, in particular heating lamp reflectors, cooling lamp reflectors, laser mirrors, antireflection systems, bandpass filters, edge filters, low-e glass and/or bodies for electrical applications, such as electrical components, diffusion barriers or capacitor elements or lamps or components in optical information technology open up, for example, the possibility of providing coated bodies or components with very high stability in combination with an improved refractive index (or dielectric constant) compared with pure $ZrO_2$, with a consequent accompanying effective and cost-saving design. This advantage is also available for products or substrates that do not allow any thermal treatment at above 150° C.

The coatings according to the invention are characterized by an increased refractive index compared with $ZrO_2$, have improved thermal behavior and lower dispersion.

Transparent oxidic coatings according to the invention have, at a wavelength of λ=550 nm, a refractive index of n=2.1 to n=2.3, preferably n=2.13 to n=2.28 and more preferably n=2.15 to n=2.25. According to the invention, a higher refractive index is most preferred.

The coating according to the invention, following thermal treatment in the oven at 950° C. for 15 hours, preferably remains transparent and/or following thermal treatment in the oven at 950° C. for 15 hours at a wavelength of λ=550 nm has a refractive index of n=2.1 to n=2.3, preferably n=2.13 to n=2.28, and particularly preferred n=2.15 to n=2.25.

Measurements are, unless otherwise specified, taken at ambient temperature of 23° C.

The dispersion index, denoted in the following also by "iHaze", of the oxidic coating according to the invention following tempering in an oven at 950° C. and for 15 hours has, for a coating with a coating thickness of 400 nm, an iHaze value of 5 to 25 nm, preferably an ihaze value of 8 to 18 nm, more preferably an iHaze value of 12 to 16 nm and most preferably an iHaze value of <15 nm. An optimal coating has no dispersion and thus an ihaze=0 nm. Most preferable, therefore, are ihaze values of $\geq$0 nm to 20 nm. Further suitable ihaze values are $\geq$1 nm, $\geq$10 nm and $\geq$15 nm. It must be stressed that the lowest possible iHaze value of 0 nm to 1 nm is most preferred.

The transparent coating according to the invention is preferably not applied on its own but in combination with other coatings to the substrates, in particular transparent substrates. In this way, for example, transparent coatings are obtained such as interference coating systems. Transparent interference coating systems of this kind, also referred to as interference coating in the description, consist of at least two refractive or other coatings that are in contact, turned towards each other and superposed or opposing each other, and each have differing refraction indexes.

A preferred transparent interference coating system according to the invention for the reflection of light within a wavelength range of the transparent spectrum of 250 to 5,000, preferably 380 to 3,000 nm, more preferably 350 to 2,500 nm, even more preferably 400 to 2,000 nm, and in particular 420 to 1,500 nm, is designed such that the interference coating system has at least one first coating(s) and second coating(s) according to the invention with a refractive index that is lower than that of the first coating(s), which are arranged on a substrate, preferably on a transparent substrate, if necessary in alternation. Further suitable reflection ranges are 800 to 2,500 nm, 820 to 2,450 nm, 850 to 2,400 nm, with particular preference for the ranges from 1,000 to 1,900 nm and 1,050 to 1,800 nm.

The second coating(s) can at λ=550 nm have a refractive index of n=1.32 to n=2.0, preferably n=1.35 to n=1.80, and particularly preferred n=1.44 to n=1.75. Further suitable values for n are 1.36; 1.42; 1.46; 1.48 and 1.50. By way of example, for an $SiO_2$ coating the refractive index can be n=1.45.

A further object of the present invention is therefore a transparent interference coating system for reflection of light within a specified wavelength range of the transparent spectrum, the coating having first coatings, and second coatings with a refractive index that is lower than that of the first coatings, which are arranged alternately on a permeable substrate, the first coatings comprising mainly zirconium oxide, which contains at least one additive, selected from the group comprising tantalum and/or tantalum oxide, the proportion of Ta atoms, in relation to the total number of metal atoms in the coating being in the range of 5 to 30%.

The transparent interference coatings according to the invention accordingly have a transparent coating according to the invention and at least one further coating with a low refractive index. By analogy to the above embodiments, coatings according to the invention are also preferred in which the first coatings comprise zirconium oxide and tantalum oxide and the proportion of Ta atoms in relation to the total number of metal atoms in the coating is in the range 5 to 30%, preferably 10 to 25%, and most preferably 15 to 20%. Further preferred features of the transparent interference coatings according to the invention can be inferred from the above disclosure of preferred transparent coatings, so that any redundancy is dispensed with here.

The coating with the high refractive index may contain as its glass-forming means at least one compound selected from the group containing phosphorous compounds and boron compounds.

Silicon dioxide is preferably used as the low refractive index coating in the transparent interference coatings according to the invention. This coating too may contain as its glass-forming means at least one compound selected from the group containing phosphorous compounds and boron compounds.

The thickness of the high or low refractive index coating can vary within wide limits and may for example be between 500 nm and 3 µm. Typical coating thicknesses of individual coatings are between 20 and 500 nm, often between 10 and 200 nm.

A transparent interference coating system according to the invention can comprise a minimum of two coatings, but it may also be constructed from a repeated succession of coatings with high and low refractive index. There may be a series of up to a few hundred coatings here.

The thickness of the interference coating systems according to the invention can likewise vary within wide limits and may for example be between 500 nm and 3 µm. According to the invention, suitable typical coating thicknesses of interference coating systems are between 50 nm and 15 µm, preferably between 75 nm and 1.5 µm, and often between 100 nm and 1 µm.

According to the invention, particularly suitable coating thicknesses are between 50 nm and 20 µm, preferably between 75 and 8 µm, and often between 100 nm and 4 µm, frequently also between 300 nm and 3 µm.

These and other aspects of the invention are apparent from and will be elucidated with reference to the embodiment described hereinafter.

In the drawing:

FIG. 1 shows a cutaway side view of a transparent interference coating system according to the invention.

As FIG. 1 shows, the transparent interference coating system 3 comprises coatings 1 with a high refractive index, the principal component of which is zirconium oxide ($ZrO_2$) and coatings 2 with a low refractive index, the principal component of which is silicon oxide ($SiO_2$). A first coating 1 with high refractive index is formed on the external surface of a permeable substrate 4; a coating 2 with a low refractive index is then formed on this coating. Further coatings 1, 2 with high and low refractive indexes are then formed alternately, so that a superposed arrangement with the desired number of coatings 1, 2 is created.

The transparent interference coating system according to the invention can be formed on both the internal and the external surface or both surfaces of a lamp bulb, in order to reflect infrared rays and to allow through rays in the visible range of the transparent spectrum.

A further object of the present invention is a lamp that comprises a transparent interference coating system according to the invention. A lamp of this kind according to the invention comprises a translucent bulb, a filament arranged within the bulb for light generation, and a transparent interference coating system according to the invention to reflect infrared rays and to allow through rays in the visible light range, which is provided on the internal and/or external side of the bulb.

Lamps of this kind according to the invention may for example be designed as halogen lamps, or as crown-silvered lamps or preferably as high-performance lamps, for example high intensity discharge (HID) lamps and in particular ultra high-performance (UHP) lamps. UHP lamps according to the invention are particularly preferred.

The coating in zirconium oxide according to the invention with at least one additive from the group comprising tantalum and/or tantalum oxide can be created on the substrate in various ways.

Suitable methods for producing thin coatings can roughly be broken down into four classes: physical vapor deposition (PVD) methods, chemical vapor deposition (CVD), electroplating and spray methods. Spray methods may be suited to thick coatings since they have very high growth rates. CVD and electroplating are as a rule not well-suited to the creation of oxidic coatings. Plasma impulse chemical vapor deposition (PICVD) is also suitable.

Chemical vapor deposition methods that can be used in accordance with the invention are physical vapor deposition such as PVD, reactive magnetron sputtering, ion sputtering, ion or plasma enhanced deposition, plasma impulse chemical vapor deposition (PICVD) and other sputter methods known to the person skilled in the art.

The PVD methods can, in turn, be broken down into three techniques: deposition techniques, sputter methods and laser ablation methods (PLD).

Of these, the sputter method is particularly well-suited to oxidic coatings and accordingly is preferred.

The term sputtering denotes cathode pulverization with ions or in the wider sense also sputter deposition of the pulverized material onto a substrate.

In the simplest embodiment of the sputter method a diode arrangement is located inside a container with a positively charged anode and a negatively charged cathode. The container is evacuated until there is just a residual gas with a pressure of a few mbar. The residual gas used is preferably an inert gas (usually argon), in order to prevent reactions with the target or the substrate. Between the anode and the cathode a voltage of between 150 and 3,000V is applied. Electrons are accelerated towards the anode, collide with argon atoms encountered on the way and ionize these. The ionized positively charged argon atoms are then accelerated towards the cathode and eject atoms from the cathodes or the target lying on top of this. Apart from neutral atoms of the target, secondary electrons are also released which ionize further argon atoms. Thus, under suitable conditions, a stationary plasma results between the two electrodes. The neutral atoms ejected from the target are distributed evenly throughout the chamber and generate a thin coating on the substrate.

The kinetic energy of the neutral target atoms and the ionized sputter gas atoms is between 1 and 300 eV. Compared with the kinetic energy of the atoms in evaporation techniques of around 0.1 eV this is very high. In particular, this high kinetic energy of the ions accelerated in the field contributes to more compact and smoother coatings than with evaporation methods.

This general sputter method has already been refined in many respects. Instead of a simple diode arrangement triodes or RF diodes can also be used for the plasma generation. With magnetron sputtering the application of a magnetic field increases the ionization probability and sputter rate.

With the DC magnetron sputter method, apart from the diode voltage of approximately 1 kV a magnetic field is also applied. The magnetic field is generated by a ring magnet around the edge of the target and a central magnet in the middle and has a strength of a few hundredths Tesla on the target surface.

The magnetic field holds the secondary electrons generated in the vicinity of the target. This increases the probability of electron-atom ionization collisions and thus also the plasma density in the vicinity of the target. This provides two major advantages over the conventional sputter method: firstly, the sputter rate increases and secondly the plasma requires a lower pressure to burn. Higher sputter rates are important for industrial production in order to guarantee a shorter production time. A lower pressure for sputtering can, however, also be an advantage for thin coatings. Because of the lower pressure, fewer foreign gas atoms are present and the sputtered coatings are therefore more pure.

The oxygen partial pressure is set at p<200 mPa. Oxygen particle pressures that are suitable according to the invention can be between 10 and 100 mPa with a particular preference for <80 mPa. Further oxygen partial pressures that are suitable according to the invention are between 5 and 150 mPa, and 10 and 80 mPa, with a particular preference for between 20 and 60 mPa.

A further object of the present invention is a method for manufacturing a transparent coating of zirconium oxide with at least one additive from the group comprising tantalum and/or tantalum oxide using the sputter technique, in which a target in zirconium and/or zirconium oxide is simultaneously used with a target comprising tantalum and/or tantalum oxide. Alternatively, coating can also take place from an alloy target comprising zirconium and tantalum or a ceramic composite target comprising zirconium oxide and tantalum oxide.

The method according to the invention is preferably carried out with argon as the residual gas, whereby preferred methods are carried out in the so-called oxide mode, i.e. in the presence of oxygen. Here, preferred methods are characterized in that the method is carried out in at an oxygen partial pressure of between 5 and 150 mPa, preferably between 10 and 80 mPa and in particular between 20 and 60 mPa.

A particular advantage of the method according to the invention is that a low working temperature can be selected. Thus, preferred methods according to the invention are characterized in that the method is carried out at a substrate temperature of between 20 and 300° C., preferably between 100 and 280° C., in particular between 150 and 270° C., and most preferably between 200 and 250° C. Here, the substrate temperature can also be varied according to the respective substrate. Thus, for quartz glass substrates temperatures of between 250 and 280° C., preferably about 170° C., have proven to be advantageous, while silicon substrates are preferably coated at between 100 and 250° C.

The coating(s) or coating properties and temperature stability according to the invention can also be obtained, for example, without heating. A particularly preferred temperature range is therefore also 50-150° C.

With the method according to the invention, even at low temperatures, a mixed oxide results that is distinguished by a high transparent quality and good mechanical and thermal stability.

The method according to the invention provides a coating that has less dispersion and a higher refractive index than a conventional $ZrO_2$ coating. In addition, the temperature stability and transparency of the coatings are increased notably at up to approximately 950° C., compared to around 800° C. for undoped $ZrO_2$.

The method according to the invention also provides very smooth coatings that are distinguished by high transparent quality. The refractive index of the coatings according to the invention is, depending on the Ta content, at between n=2.2 and n=2.3, $\lambda$=550 nm.

Preferred variants of the method according to the invention use the magnetron sputter technique, with double magnetron sputter methods, in turn, being preferred. The field strength of preferred magnetron or double-magnetron sputter methods is between 10 and approximately 200 mT.

Irrespective of whether the magnetron or double-magnetron method is used, pulsed variants of the method are preferred. Here, for example, methods according to the invention are preferred in which the method is carried out at a pulse frequency of between 10 and 100 kHz, preferably between 20 and 70 kHz and in particular between 30 and 50 kHz.

In order to achieve a coating with a preferred temperature-stable coating the sputter density is between 9 and 15 W/cm² with a particular preference for between 11 and 12 W/cm². The sputter density can be between 1 W/cm² and 40 W/cm².

The sputter density is defined as the induced process power normalized to the target area used.

A further possibility for varying the thickness of the coatings according to the invention to be applied is to adjust the power that is applied to the respective Zr or Ta target. Here methods according to the invention are preferred in which the total power applied to the target of $P=P_{Zirconium-Target}+P_{Tantalum-Target}$ is between 2,000 and 10,000 W, preferably between 3,000 and 6,000 W and in particular between 3,500 and 5,000 W.

Sputtering of mixed oxide coatings is possible according to the invention, for example from 2 different metal targets or from one or more metal alloy targets and from ceramic oxide targets.

Working is generally in an oxygen/argon atmosphere.

The invention is elucidated by the following, non-limiting, embodiment.

EXAMPLE

Transparent coatings of zirconium oxide and tantalum oxide according to the invention were produced using a bipolar pulsed double magnetron sputter method on quartz glass substrates of 50×50 mm in size.

For this, two metal magnetron targets made from zirconium or tantalum and arranged edgewise at 20° to one another were simultaneously eroded at a pulse frequency of 40 kHz in oxide mode, at an oxygen partial pressure of 40 mPa and a total pressure of between 190 and 270 mPa. The period per target was 25 µs. Thanks to a heating element arranged behind the substrate, the temperature on the substrates at the start of the process was 270° C. The horizontal component of the magnetic field applied across the magnetron at the position of the substrate was about 30 mT.

The ratio of ingredients of zirconium and tantalum varied over the separately adjustable powers that were applied to both targets, with the total power P ($P=P_{Zirconium-Target}+P_{Tantalum-Target}$) always being 4 kW.

With this method according to the invention transparent oxidic coatings with a coating thickness of 400 nm were obtained. The ratio of Ta/(Zr+Ta) was 0.11, and the refractive index at λ=550 nm was n=2.26.

The thermal stability of the coating according to the invention is illustrated by the fact that the refractive index of n=2.26 at λ=550 nm did not vary over the temperature range of the deposition temperature up to 950° C.

General Information on the Measurement Conditions:
T=23° C. (ambient temperature)
Atmospheric pressure=laboratory air (normal pressure)

Tempering Process

Tempering in laboratory air under normal pressure. Tempering time: 15 hours in each case.

X-Ray Diffractometry

In order to be able to make statements about the phase compositions and the grain sizes, X-ray diffractometry measurements were performed on a Siemens D5000 diffractometer. Here, in the (θ-2θ)-method a Bragg-Brentano geometry without monchromator was used. An Ni filter suppressed the incident Cu-$K_\beta$-line.

A Cu-$K_\alpha$-tube was used as the radiation source. Typical measurement parameters were: Step by step: 2θ=0.02°, integration time: Δt=1s. The accelerating voltage used was 40 kV for a beam current of 30 mA.

For the phase assignment a package developed by Siemens and incorporated into the measurement software was used.

Haze

The quantification of the dispersion level of the samples was based on the determination of a parameter which is referred to as "Haze". With this measurement method a spectral photometer is used which determines the diffusely dispersed components of the electromagnetic radiation transmitted and normalizes it to the total transmitted current ($T_{total}=T_{spec}+T_{diffus}$). The haze in the transmission is therefore defined in a range of values between zero and one as $$\text{Haze}(\lambda) = \frac{T_{diffus}(\lambda)}{T_{total}(\lambda)} = \frac{T_{diffus}(\lambda)}{T_{diffus}(\lambda) + T_{spec}(\lambda)} \quad (1)$$

It should be noted that the measuring curves generally contain current modulations because of interference effects, which due to the normalization cannot be fully compensated. Thanks to the measurement over a wide spectral range, however, their effect is suppressed to a large extent.

With suitable mathematical methods, the respective dispersion level of the sample can be quantified from the spectral measurement data. In the present exercise, to this end and in accordance with equation (2), the area below the curve in the visible spectral range (λ=380 . . . 800 nm) was integrated ("iHaze"), so that the current modulations even out. Since the coating thicknesses of all samples were set at around 400±10 nm, consideration of any density effect of the dispersion could be dispensed with. The dispersion contribution of the glass substrate due to any non-uniformities or incomplete surface cleaning could also be ignored in this assessment since it is within the order of magnitude of the measuring accuracy. As a result of the spectral integration of the dimensionless "Haze" variable, the resultant "iHaze" variable takes on the dimension [length in nm].

$$iHaze = \int_{380\,nm}^{800\,nm} \text{Haze}(\lambda)d\lambda \quad (2)$$

The following table gives the iHaze values for pure $ZrO_2$ and for the transparent coating according to the invention for various temperatures (uncoated substrate: iHaze=2nm):

| Temperature | iHaze [nm] | |
| --- | --- | --- |
| [° C.] | $ZrO_2$ | Ta/(Zr + Ta) = 0.11 |
| 700 | 8 | 3 |
| 800 | 15 | 3.5 |
| 900 | 19 | 5 |
| 950 | 28 | 8 |

The table shows that the coatings according to the invention have notably improved dispersion properties.

Measuring instruments: The measurements were carried out with non-polarized light on a Cary 5E spectral photometer from Varian in a spectral range of 350 to 800 nm. In order to gauge the diffusely transmitted components Tdiffus(λ) an integrating sphere was provided (measuring spot size: 10×10 mm).

Here, the directed and non-diff-used components of the electromagnetic radiation transmitted for a vertical radiation incidence are derived from the measuring sphere and concentrated into a beam dump. The diffused signal component Tdiffus(λ) is captured in a sphere (diameter 110 mm) coated with PTFE (polytetrafluoroethylene) and measured via a photodiode that is protected from direct irradiation. The higher this is, the stronger the sample diffuses the light. Because of the multiple reflections of the light on the inner surface of the sphere at each point of the sphere volume the same wavelength-dependent radiation intensity is present. Because of the glare, the detector does not measure any direct signal from the sample or from the indirectly illuminated sphere surface (in the case of closed beam dump). If the beam dump is covered by a barium sulfate plate, apart from the diffused component the specular component Tspec(λ) is also contained in the measurement signal. The Haze is calculated according to equation 1.

Ellipsometry

To determine the refractive index and the coating thickness of the samples the ellipsometry method of measurement was used. The method is based on the change in polarization state of a wave when reflected onto a sample surface under investigation. The change in polarization state is described by the quotients ρ of the two complex Fresnel reflection coefficients rp and rs. This can be illustrated by the equation $$\rho = \frac{r_p}{r_s} = \tan\Psi \cdot e^{i\Delta} \quad (3)$$

which is also known as the ellipsometric basic equation. Here, Ψ represents the change in the amplitude ratio of the vertical and parallel components and Δ measures the change in the phase difference between the two part-waves as a result of the reflection. The subscripts s and p symbolize the part-waves polarized vertically and parallel to the incidence level. The determination of the refractive index was carried out according to R. M. A. Azzam, N. M. Bashara, Ellipsometry and polarized light, North Holland, Amsterdam (1987).

If a suitable material model is now defined for the coating/substrate system, in which its properties (transparent constants, coating thickness) are combined with the complex reflection coefficients and the measurement parameters (wavelength, angle of incidence), then the change in polarization state allows accurate statements to be made on a series of important film parameters. The dispersion of the transparent constants of the samples was described using a standard parameterized Lorentz oscillator model. This defines the oscillatory behavior of the electrons, which have a flexible bond with the solid atoms, when excited with electromagnetic radiation (see: A. Röseler, Infrared Spectroscopic Ellipsometry, Akademie-Verlag, Berlin (1990)). The refractive indexes n or n550 that are given relate to a wavelength of $\lambda=550$ nm and are accurate to within ±0.01.

For the ellipsometric measurements a spectrophotometric ex-situ ellipsometer SE800 from SENTECH Instruments was available, which works in the so-called polarizer-compensator-sample-step-scan-analyzer (PCSSA) configuration.

The evaluation was carried out in the spectral range from 380 to 850 nm and with angles of incidence varying between 55 and 75° ($\Delta=5°$). In order to fit the measurement data to the model a commercial evaluation software package from SENTECH Instruments called AdvancedFit was available which incorporates a numeric method according to the simplex algorithm.

REFERENCE LIST 1. transparent coating (first coating)
2. second coating with a refractive index that is lower than that of the first coating
3. transparent interference coating system
4. permeable substrate

The invention claimed is:

1. A transparent, temperature-stable coating comprising zirconium oxide with at least one additive from the group comprising tantalum and tantalum oxide, wherein the proportion of Ta atoms in the coating to the total of metal atoms in the coating is in the range of 5% to 30%.

2. The transparent coating of claim 1, wherein the coating is based on zirconium oxide and tantalum oxide.

3. The transparent coating of claim 1, wherein at $\lambda=550$ nm the refractive index of the coating has a value of n=2.1 to n=2.3.

4. The transparent coating of claim 1, wherein the coating remains transparent following thermal treatment in the oven at 950° C. for 15 hours.

5. The transparent coating of claim 1, wherein at a coating thickness of 400 nm the coating, following thermal treatment in the oven at 950° C. for 15 hours remains transparent and/or has an iHaze value for a coating of $\geq 0$ nm to 25 nm.

6. The transparent coating of claim 1, wherein the coating is essentially amorphous.

7. A transparent interference coating system for reflection of light within a specified wavelength range of the transparent spectrum of 250 to 5,000 nm wherein the coating comprises a number of first coating (s) as recited in claim 1 and a number of second coating (s) having a refractive index lower than that of the first coating(s), said first coatings and second coatings being arranged in alternation on a substrate.

8. The transparent interference coating system of claim 7, wherein the refractive index of said second coatings is n=1.32 to n=2.0, at a wavelength of $\lambda=550$ nm.

9. A high-pressure gas intensity discharge lamp having the transparent coating of claim 1 provided on least one of the internal and the external side of a bulb of the lamp.

10. A method comprising use of the transparent coating of claim 1 for coating at least one of a beam-forming device, beam-dividing device, optical fiber component, lighting means, lamp, lamp housing, gas sensor, glass, transparent element, filter, lens, mirror, laser mirror, transparent filter system, hot mirror, cold mirror, anti-reflection system, bandpass filter, edge filter, low-e glas electrical component, diffusion barrier and capacitor element.

11. A method of manufacturing the coating of claim 1, in which zirconium oxide is deposited onto a substrate surface by vapor at a deposition temperature of 20 to 300° C. from at least one target selected from the group comprising zirconium, zirconium oxide, tantalum and tantalum oxide.

12. The coating of claim 1, wherein the proportion of Ta atoms in the coating to the total of metal atoms in the coating is in the range of 10% to 25%.

13. The coating of claim 1, wherein the proportion of Ta atoms in the coating to the total of metal atoms in the coating is in the range of 15% to 20%.

14. The coating of claim 2, wherein the proportion of Ta atoms in the coating to the total of metal atoms in the coating is in the range of 10% to 25%.

15. The coating of claim 2, wherein the proportion of Ta atoms in the coating to the total of metal atoms in the coating is in the range of 15% to 20%.

16. The coating of claim 3, wherein at $\lambda=550$ nm the refractive index of the coating has a value of n=2.13 to n=2.28.

17. The coating of claim 3, wherein at $\lambda=550$ nm the refractive index of the coating has a value of n=2.15 to n=2.25.

18. The transparent interference coating system of claim 7, wherein the refractive index of said second coatings is n=1.35 to n=1.80 at a wavelength of $\lambda=550$ nm.

19. The transparent interference coating system of claim 7, wherein the refractive index of said second coatings is n=1.44 to n=1.75 at a wavelength of $\lambda=550$ nm.

20. A high-pressure gas intensity discharge lamp having the transparent coating of claim 1 provided on at least one of the internal and the external side of a bulb of the lamp.

21. A high-pressure gas intensity discharge lamp having the transparent interference coating system of claim 7 provided on at least one of the internal and the external side of a bulb of the lamp.

* * * * *